United States Patent
Bäse et al.

(10) Patent No.: US 7,420,971 B2
(45) Date of Patent: Sep. 2, 2008

(54) COMPRESSION METHOD FOR A BYTE STREAM IN NETWORK PROTOCOLS

(75) Inventors: Gero Bäse, München (DE); Robert Kutka, Geltendorf (DE); Norbert Oertel, Landshut (DE)

(73) Assignee: Siemens Aktiengesellschaft, Munich (DE)

( * ) Notice: Subject to any disclaimer, the term of this patent is extended or adjusted under 35 U.S.C. 154(b) by 597 days.

(21) Appl. No.: 11/041,028

(22) Filed: Jan. 21, 2005

(65) Prior Publication Data

US 2005/0185648 A1    Aug. 25, 2005

(30) Foreign Application Priority Data

Jan. 23, 2004   (DE)   .................... 10 2004 003 551

(51) Int. Cl.
- *H04L 12/28*   (2006.01)
- *H04L 12/56*   (2006.01)
- *H04J 3/18*   (2006.01)
- *G06F 15/16*   (2006.01)

(52) U.S. Cl. ................ 370/389; 370/392; 370/477; 709/247

(58) Field of Classification Search ......... 370/349–392, 370/474–477, 252–338; 709/247–249
See application file for complete search history.

(56) References Cited

U.S. PATENT DOCUMENTS

| | | | |
|---|---|---|---|
| 6,751,209 B1 * | 6/2004 | Hamiti et al. ............. | 370/349 |
| 6,882,637 B1 * | 4/2005 | Le et al. .................. | 370/349 |
| 7,061,936 B2 * | 6/2006 | Yoshimura et al. ......... | 370/474 |
| 7,158,518 B2 * | 1/2007 | Burmeister et al. ........ | 370/392 |
| 7,212,511 B2 * | 5/2007 | Jonsson et al. ............ | 370/338 |
| 7,281,187 B2 * | 10/2007 | Yonge et al. ............. | 714/752 |
| 7,289,536 B2 * | 10/2007 | Hans et al. .............. | 370/474 |
| 2002/0141370 A1 * | 10/2002 | Abrol et al. ............. | 370/338 |
| 2003/0007512 A1 | 1/2003 | Tourunen et al | |
| 2003/0182454 A1 * | 9/2003 | Huth et al. .............. | 709/247 |
| 2005/0195750 A1 * | 9/2005 | Le et al. ................. | 370/252 |
| 2005/0259687 A1 * | 11/2005 | Abrol et al. ............. | 370/469 |

FOREIGN PATENT DOCUMENTS

| | | |
|---|---|---|
| WO | WO 00/49748 | 8/2000 |
| WO | WO 01/28180 A2 | 4/2001 |
| WO | WO 02/09386 A1 | 1/2002 |

OTHER PUBLICATIONS

S. Casner and V. Jacobson, "Compressing IP/UDP/RTP Headers for Low-Speed Serial Links", Network Working Group, Feb. 1999, pp. 1-24, Internet: http://www.ietf.org/rfc/rfc2508.txt?number=2508.

* cited by examiner

*Primary Examiner*—M. Phan

(57) ABSTRACT

A method is described for transmitting a byte stream (1) from a transmitter unit to a receiver unit in a network protocol, with the following steps: Removal of at least one data area (4a,4b) of the byte stream (1) from the byte stream, Transmission to the receiving unit of information relating to which data area (4a,4b) or which data areas (4a,4b) has or have been removed from the byte stream (1) and/or relating to the way in which the shortened byte stream is to be further processed, Transmission of the byte stream (5) shortened by at least one data area (4a, 4b) to the receiver unit, which, from the information and the shortened byte stream, determines and further processes the at least one data area removed by the transmitter unit.

13 Claims, 1 Drawing Sheet

COMPRESSION METHOD FOR A BYTE STREAM IN NETWORK PROTOCOLS

CROSS REFERENCE TO RELATED APPLICATIONS

This application claims priority to the German application No. 10 2004 003 551.2, filed Jan. 23, 2004 and which is incorporated by reference herein in its entirety.

FIELD OF INVENTION

The invention relates to a method for transmitting a byte stream from a transmitter unit to a receiver unit in a network protocol as well as to the corresponding encoder or decoder and transceiver units.

BACKGROUND OF INVENTION

For the transmission of payload data over packet-switched communication networks said data is as a rule preceded by header data (abbreviated to header) which is essential for the transport of the data packet in the communication network. Header in this case refers to the part of the data packet containing not payload data but various administration data, e.g. address, packet number, sender id. packet status as well as data for error detection and error correction (e.g. checksum CRC).

With narrowband data streams this header data can amount to a multiple of the payload data to be transmitted. Header compression methods are therefore frequently used for such data streams, such as PPP dial-up connections for example. A compression of the header data is above all desirable for a transmission over wireless connections, since extensive volumes of header data of IP protocols impose a particular load on mobile radio channels.

IP is responsible for the connectionless transport of data from a sender, over one or more communication networks, to a recipient, with no error detection or correction being performed. This means that IP does not concern itself with harmful or lost packets. The abbreviation IP here stands for Internet Protocol, a protocol of the TCP/IP-family on layer 3 of the OSI reference model. IP is used by a number of protocols located in higher layers of the OSI reference model, primarily by TCP (Transfer Control Protocol), but also by UDP (User Datagram Protocol).

A known protocol header compression method can be found for example in S. Casner and V. Jacobson, "Compressing IP/UDP/RTP Headers for Low-speed Serial Links", Network Working Group, Request for Comments: 2508; (available for inspection on the Internet at http://www.ietf.org/rfc/rfc2508.txt?number=2508).

This proposes different encodings for different protocols. Thus separate encoding is undertaken for RTP headers of end-to-end connections, whereas in the case of a link-to-link-connection a common compression of RTP/UDP/IP headers is possible.

Provision is made here for encoding with three different code stages:
 a full header (FH)
 a first order difference (FO), namely the description of two consecutive headers by a variable length code and
 a second order difference (SO), i.e. the transmission of the differences of two FO headers.

For a compression of TCP headers, after an uncompressed header has been transmitted once, fields which change are described by a differential encoding in order to reduce their size. In addition fields which change are completely eliminated by calculating changes on the basis of the length of a packet. This is based on the knowledge that around half of the bytes in IP and TCP headers remain unchanged for the duration of a connection.

One of the disadvantages of this method is that these known compression methods are specific to certain protocols and only function for these. For the different variants of the encoding of individual protocols or of more than one protocol at the same time different encoders must be available, which increases the effort involved and adversely affects economy. To enable the new protocols to be compressed, it is necessary to define new methods, implement them and update the network components.

Other approaches tackle the problem without prior knowledge about the protocols to be compressed and consider a data packet, consisting of header data and payload data, as a byte or bit stream and encode this differentially. One disadvantage of these methods is that the checksums frequently occurring in the header data exhibit a high entropy and cannot be compressed at all or can barely be compressed. This header data is always transmitted in each case and needs a wide bandwidth, regardless of the payload data to be transmitted.

SUMMARY OF INVENTION

The task of the present invention is therefore to create an opportunity for compressing a byte stream in a network protocol which can be employed equally efficiently regardless of the relevant protocol type.

This object is achieved by the claims.

In accordance with the present invention the method features the following steps: Removing at least one data area of the byte stream from the byte stream; Transmission of information to the receiver unit relating to the data area or data areas which have been removed from the byte stream and/or the way in which the shortened byte stream is to be further processed; and transmission of the byte stream shortened by at least one data area to the receiver unit which determines and further processes from the information and the shortened byte stream the at least one data area removed by the transmission unit.

The removed data areas preferably represent header data and/or data for error detection or for error correction of a data packet. In a byte stream these are those data areas which exhibit the greatest entropy and thus can only be inadequately reduced in size by a compression.

In other words the underlying principle of the invention is to remove data areas with high entropy from the initially complete byte stream. The shortened byte stream can then advantageously be compressed and transmitted using a universal compression method without specifying the communication protocol.

The data or information contained in the removed data areas can be of great relevance for the receiver unit and must then be made available to it in another way. To do this it is encoded in a way known to the receiver unit, preferably differentially, and routed to the receiver unit either in a separate message, a signaling message or together with the shortened byte stream. This enables the receiver unit to reconstruct the removed data areas on the basis of encoding known to it and to insert them again at the original position in the byte stream.

The term "insert" does not necessarily mean here that the reconstructed data is inserted at the original position of the shortened byte stream. Instead the position of the reconstructed data in the byte stream can be freely selected in very general terms.

The receiver unit can also merely check the information as to which data area or data areas were removed from the byte stream to ensure that it is correct and if necessary further process the shortened byte stream without inserting the reconstructed data.

Provided information is transmitted to the receiver unit as to the way in which the shortened byte stream is to be further processed a reconstruction of the removed data area could be dispensed with and direct further processing of the shortened byte stream could be performed. In relation to the application this could represent a change of the transmission protocol by the receiver unit.

The removed data areas are not simply compressed in the signaling message. The signaling message merely contains information as to the way in which the information of the removed data areas can be reconstructed. The information transferred to the receiver unit preferably features an entry about the position and/or the length and/or the type of the relationship covering a data area removed. The signaling message itself can therefore manage with far less information in relation to the removed data areas and additionally be subjected to a compression method.

In accordance with an advantageous embodiment the at least one data area is removed from the byte stream and the at least one shortened data area is determined from the signaling message and the shortened byte stream using a prespecified algorithm. The at least one data area is thus removed by means of a prespecified algorithm which is also known to the receiver unit. The algorithm is embodied such that the only data areas removed are those which can be exclusively reconstructed for the subsequent shortened byte stream. This allows the receiver unit, if it knows the algorithm used and specific further information such as the position, the length and the type of the relationship relating to the relevant data area removed, to reconstruct this area or these areas from the shortened byte stream and to reconstruct the signaling message containing said information.

Expediently the step of determining the data areas that can be removed is performed before the removal of the at least one data area. This is a direct result of what has been stated above since the only data areas that can be removed from the byte stream by the transmitter unit are those that can be reconstructed from just the shortened byte stream and the specification of further information.

In of a further embodiment determining data areas that can be removed comprises searching all possible header positions and lengths using at least one algorithm. In this case there is reference back to prior knowledge about the positions at which header data is preferably arranged. The embodiment of header data is subject to certain rules, so that in general the, header lengths (e.g. 16 bits or 32 bits) normally used are known and can be taken into account by the algorithm.

The encoder in accordance with the invention is set up for processing of a byte stream in network protocols in accordance with the method given above.

The decoder in accordance with the invention is set up to reconstruct the original non-shortened byte stream from a signaling message and the shortened byte stream.

Further advantages and details of the invention are produced with reference to the comprehensive presentation of the Figure given below.

DETAILED DESCRIPTION OF INVENTION

Figure 1A:
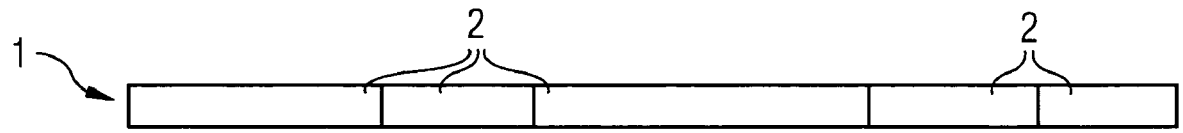
FIG. 1A to FIG. 1E show exemplary byte streams in the context of the invention.

A byte stream 1 to be transmitted from a transmitter unit to a receiver unit 1 is shown in FIG. 1a. Byte stream 1 is made up of a series of data areas 2 which represent either payload data or header data. Before byte stream 1 is sent to the receiver unit, the transmitter unit attempts to determine as many of the data areas 2 in the byte stream 1 as possible which can be reconstructed by an algorithmic relationship from the remaining data areas of the byte stream. In the method proposed the transmitter unit and the receiver unit have a plurality of possible algorithms available to them, through which data areas, especially header fields, can be recognized or reconstructed from the remaining data of the data packet present as a byte stream.

The search for header data for which an algorithmic relationship of this nature exists could be undertaken using Brute Force algorithm for example which searches through all possible header start positions, lengths using algorithms stored in the transmitter unit.

If such information about the start and the length of header fields is not known, it can be assumed that the header areas vary greatly, in which case these areas can be considered as possible candidates for an algorithmic relationship.

Figure 1B:
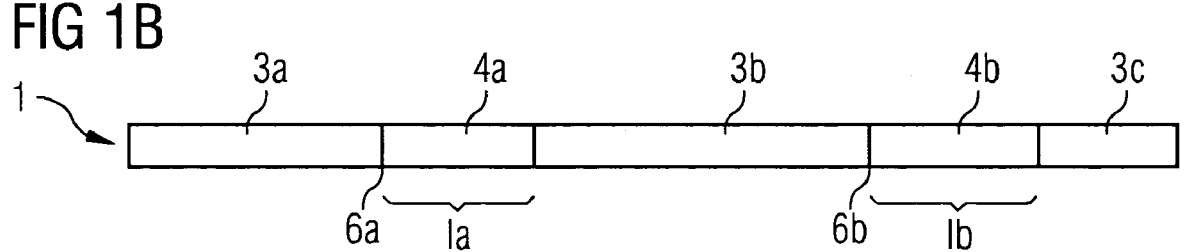

FIG. 1b shows data areas which can be reconstructed by means of an algorithmic relationship (and thus represent header data and/or data for error detection or for error correction of a data packet), indicated by reference symbols 4a and 4b. Data areas with information representing payload data is indicated by the reference symbols 3a, 3b and 3c. The distinguishing feature of data areas 4a, 4b is thus that these areas can be reconstructed by means of an algorithm known to the transmitter unit and the receiver unit from the remaining data areas 3a, 3b, 3c.

Figure 1C:
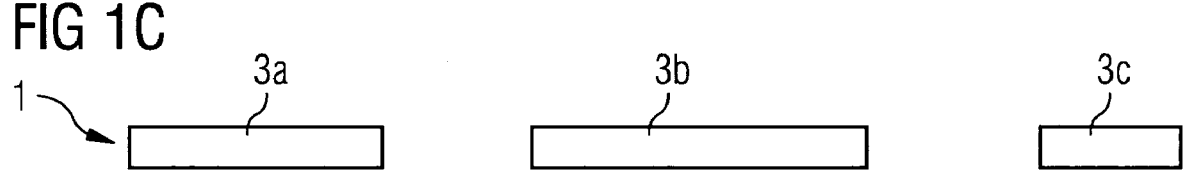
Figure 1D:
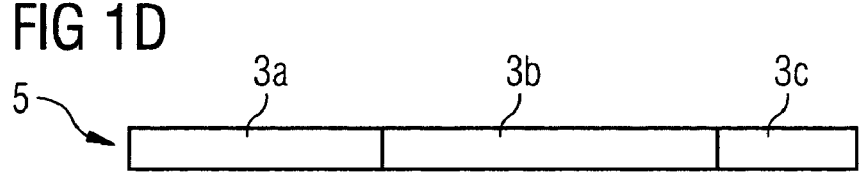

In the next procedural step (FIG. 1c) the data areas 4a, 4b are removed from the byte stream 1, resulting in the shortened byte stream 5 shown in FIG. 1d.

Preferably before, but also after the transmission of the shortened byte stream 5 a signaling message is transferred from the transmitter unit to the receiver unit containing information as to the algorithm with which the removed data areas 4a, 4b can be reconstructed from the shortened byte stream 5. As further information the receiver unit is notified of the positions (reference symbols 6a, 6b in FIGS. 1b and 1e) at which the reconstructed data areas have to be reinserted.

Figure 1E:
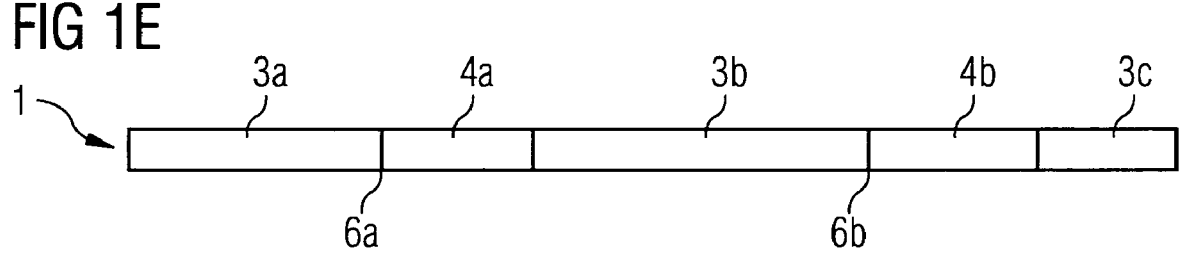

This information enables the transmitter to reconstruct the original, unshortened byte stream 1 as shown in FIG. 1e.

The advantage of the method in accordance with the invention lies in the fact that the shortened byte stream 5 can be subjected to a universal compression method, like the one illustrated in WO 02/09386 A1 for example. Before it is compressed, the shortened byte stream no longer contains any information with high entropy. Since the only data areas removed from the byte stream are those which can be algorithmically reconstructed from the remaining data to be transmitted (this is shortened byte stream 5), it is possible to dispense with direct transmission of this data with high entropy. Instead only the information transferred is that which enables the receiver unit to reconstruct removed data areas and insert them at the specified position again.

The data areas to be removed are preferably header data and/or data for error detection or error correction of a data packet. This means that the shortened byte stream no longer contains any information on the basis of which a correct transmission can be verified by the receiving unit. The transfer of such data, of a checksum CRC for example is deliberately dispensed with since it is assumed that the first layer of the OSII reference model guarantees error-free transmission of the data packet. Conversely this means that mechanisms to check error-free data transmission on a layer 2 or a higher layer of the OSI reference model are not absolutely necessary.

The outstanding characteristic of the method in accordance with the invention is that no information about the protocol used is contained in the shortened byte stream to be transmitted. This means that the method in accordance with the invention is universally applicable, regardless of the circumstances of the transmitter or receiver units and possible technical changes to them.

The efficiency of universal header compression methods is further enhanced by the invention. This reduces the overhead from network protocols, which conversely increases the share of the data rate which is available for payload data. This for example makes possible shorter download times or better audio and video quality over packet switched communication networks.

The method in accordance with the invention could be used in a router which finds the header data to be removed and can check the correctness of the data packets on layer 1 of the OSI reference model, before the actual forwarding to the receiver unit. Errored data packets could already be excluded in this way from forwarding at this point, which would reduce the load on the communication network. This can be undertaken without explicit knowledge of the protocols used, with the method also being suitable for changed hardware or changed protocols.

The invention claimed is:

1. A method for transmitting a byte stream from a transmitter unit to a receiver unit in a network protocol, comprising the following steps:
    removing at least one data area of the byte stream from the byte stream to form a shortened byte stream;
    transmitting information relating to which data area or which data areas have been removed from the byte stream and/or relating to the way in which the shortened byte stream is to be processed, to the receiving unit;
    transmitting the byte stream shortened by at least one data area to the receiver unit;
    determining by the receiver unit the at least one data area removed by the transmitter unit by using the information and the shortened byte stream; and
processing by the receiver unit the at least one data area determined,
wherein the information relating to which data area or which data areas has or have been removed from the byte stream and/or to the way in which the shortened byte stream is to be further processed is transferred in a signaling message to the receiver unit.

2. A method for transmitting a byte stream from a transmitter unit to a receiver unit in a network protocol, comprising the following steps:
    removing at least one data area of the byte stream from the byte stream to form a shortened byte stream;
    transmitting information relating to which data area or which data areas have been removed from the byte stream and/or relating to the way in which the shortened byte stream is to be processed, to the receiving unit;
    transmitting the byte stream shortened by at least one data area to the receiver unit;
    determining by the receiver unit the at least one data area removed by the transmitter unit by using the information and the shortened byte stream; and
processing by the receiver unit the at least one data area determined,
wherein the information relating to which data area or which data areas has or have been removed from the byte stream and/or to the way in which the shortened byte stream is to be processed is encoded differentially at the transmission unit prior to transmission.

3. The method in accordance with claim 1, wherein the information relating to which data area or which data areas has or have been removed from the byte stream and/or to the way in which the shortened byte stream is to be processed is encoded differentially at the transmission unit prior to transmission.

4. The method in accordance with claim 1, wherein the processing of the information and of the shortened byte stream by the receiver unit comprises checking the correctness of the shortened byte stream.

5. The method in accordance with claim 2, wherein the processing of the information and of the shortened byte stream by the receiver unit comprises checking the correctness of the shortened byte stream.

6. The method in accordance with claim 2, wherein the processing of the information and of the shortened byte stream by the receiver unit comprises insertion of the removed data areas into the shortened byte stream to restore the original unshortened byte stream.

7. The method in accordance with claim 1, wherein the processing of the information and of the shortened byte stream by the receiver unit comprises insertion of the removed data areas into the shortened byte stream to restore the original unshortened byte stream.

8. The method in accordance with claim 1, wherein the at least one data area is removed from the byte stream and the at least one shortened data area is determined from the signaling message and the shortened byte stream by a prespecified algorithm.

9. The method in accordance with claim 1, wherein the information indicates a position and/or a length and/or a type of a relationship relating to the removed data area.

10. The method in accordance with claim 1, wherein the removed data area represents header data and/or data for error detection or error correction of a data packet.

11. The method in accordance with claim 1, wherein the shortened byte is transmitted by a universal compression method without specifying the network protocol to be used.

12. The method in accordance with claim 1, wherein before the at least one data area is removed the step of determining removable data areas is performed.

13. The method in accordance with claim 8, wherein determining the removable data areas comprises searching through all possible header positions and header lengths using an algorithm.

* * * * *